United States Patent [19]

Tschirky et al.

[11] 4,029,368

[45] June 14, 1977

[54] RADIAL BEARINGS

[75] Inventors: John E. Tschirky, Long Beach; Gary Monroe Crase, Cypress, both of Calif.

[73] Assignee: Smith International, Inc., Newport Beach, Calif.

[22] Filed: Jan. 27, 1975

[21] Appl. No.: 544,143

Related U.S. Application Data

[63] Continuation-in-part of Ser. No. 388,586, Aug. 15, 1973, Pat. No. 3,879,094.

[52] U.S. Cl. .............................. 308/8.2; 175/371; 308/135; 415/170 R
[51] Int. Cl.² ..................................... F16C 19/00
[58] Field of Search ............... 308/135, 8.2, 237 R, 308/237 A, 239, DIG. 8, 78, DIG. 5, 4 R, 4 A; 175/371, 372; 29/175; 415/170 R

[56] References Cited

UNITED STATES PATENTS 2,590,761    3/1952    Edgar ........................... 308/237 A

*Primary Examiner*—Philip Goodman
*Assistant Examiner*—Richard A. Bertsch
*Attorney, Agent, or Firm*—Subkow and Kriegel

[57] ABSTRACT

This invention relates to hard metal radial bearings particularly suitable in connection with thrust bearings which are lubricated by erosive fluids passing through the radial bearings as are employed in down-hole drilling motors.

20 Claims, 14 Drawing Figures

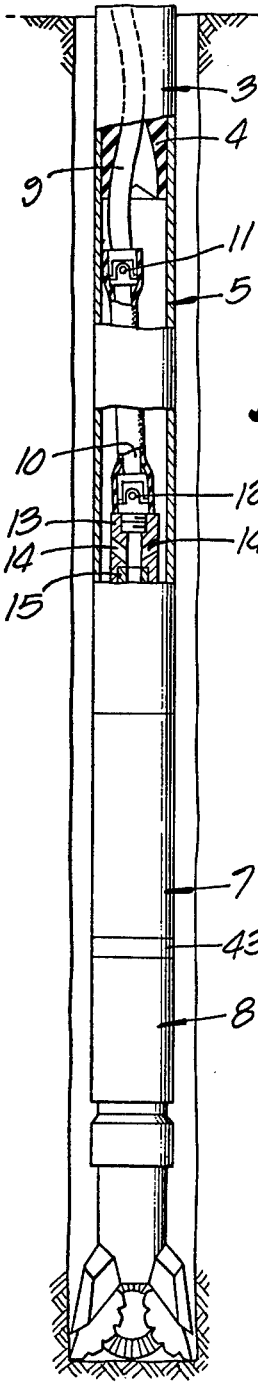
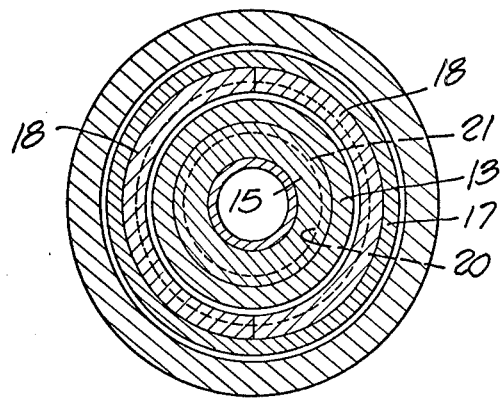
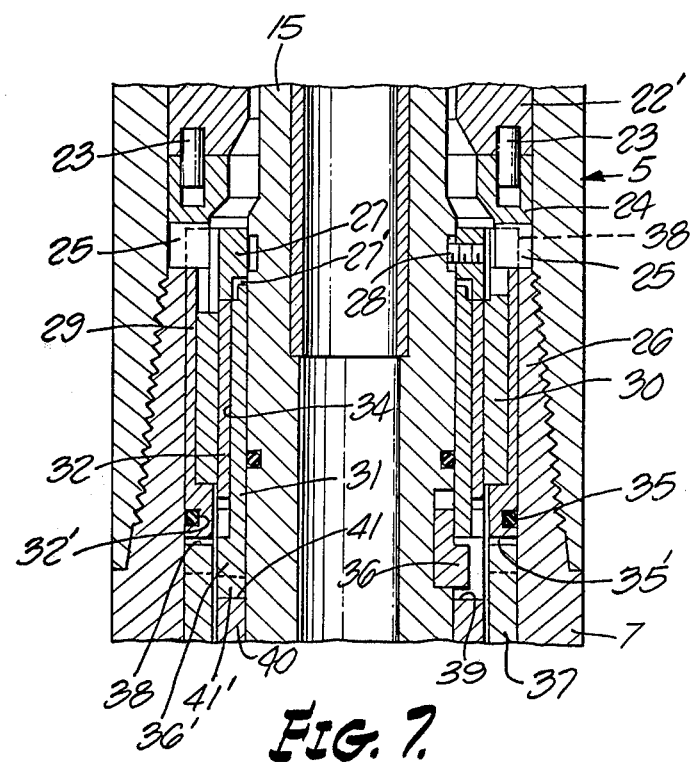
FIG. 1.
FIG. 6.
FIG. 7.

RADIAL BEARINGS

This application is a continuation-in-part of application Ser. No. 388,586, filed Aug. 15, 1973 now Pat. No. 3,879,094.

BACKGROUND OF THE INVENTION

The use of motors in bore hole drilling, especially drilling for oil and gas but also in mining operations, has been a standard procedure in the art. Such motors are employed to rotate drills for boring in the earth both for forming a bore hole and also for coring. The motors are also useful in oil field operations, such as tube cleaning, milling operations, cement drilling and other operations where it is desired to rotate a rod at the end of which a tool is to be rotated. We refer to such motors as in-hole drills when designed to be run at the end of a pipe and adjacent to the drill bit. In the usual case, the rotor of the motor and the drill bit rotate with respect to a stator which, in turn, is connected to a conventional drill string composed, in the case of the drilling of well bores, of a "kelly," drill pipe and drill collar as required. This string extends to the surface with the kelly mounted in the rotary table. Where the in-hole motor is a hydraulic motor used as an in-hole motor used in drilling, the liquid is the usual drilling fluid, i.e., mud or gas. It serves its usual function in the drilling operation, returning to the surface carrying the detritus, i.e., cuttings resulting from the drilling operation. However, in this combination, the circulating mud has an additional function and that is to supply the hydraulic power to operate the hydraulic motor.

One of the primary problems resides in the design of the bearing system which will permit operations for periods of economic length.

Because of the failure of bearing seals in the prior art, it has been conventional to employ bearings without seals and to rely on a part of the circulating mud to pass through the bearings to lubricate them. Such bearing systems are shown in E. P. Garrison et al, U.S. Pat. No. 3,516,718 issued Jan. 23, 1970.

When mud lubricated bearings are employed with motors of the helicoidal type, such as have been employed in the prior art in-hole motors, problems arise with respect to limiting the flow of mud through the bearings and problems arise from the eccentric motion of the rotor. Such motors are shown in Clark U.S. Pat. No. 3,112,801, patented Dec. 3, 1963, and have been widely distributed by Smith International, Inc. under their registered trademark "Dyna-Drill". Such motors are described in the article by H. M. Rollins, "Bit Guiding Tools Provide Better Control of Directional Drills," World Oil, June 1966, pages 124–135, and are also discussed below.

The prior art solutions for limiting the by-pass of mud through the bearings are shown in the Garrison patent. These include the provision of a grooved rubber radial bearing which also acts as a flow restrictor to limit the fluid by-passing through the bearings so as not to rob unduly the main flow through the bit nozzles required to provide the necessary flow to remove the cuttings.

Since the rotor of the motor rotates in an eccentric manner, it is necessary to convert this motion into a true rotation about a fixed axis so that the bit may be rotated in the proper manner. This is accomplished by connecting the end of the rotor to a connecting rod by means of a universal joint and connecting the connecting rod to a drive shaft by means of a second universal joint.

Problems have arisen in such prior art combination. The rubber radial bearings, which even in the first place due to molding limitations do not act adequately to restrict the amount of by-pass, deteriorate in use and result in premature failure. This failure includes erosion of the bearing passageways whereby the grooves are washed out. The rubber is torn away from the sleeve to which it was bonded. Bearing failure occurs, in part, due to the excessive flow of mud through the bearings resulting in an excessive erosion of the bearings. An additional difficulty is that the excessive by-pass requires an increase in the volumetric rate of mud flow into the system in order to maintain the required nozzle velocities and pressure drops across the bit nozzles to move the mud cuttings to the surface, and aid in the cutting action.

The percentage of the fluid by-passed, even with newly formed radial rubber bearings, it excessive because it is difficult to mold such bearings to form passageways through the bearings that will have the desired flow resistance and yet provide a suitable bearing surface which will not have excessive frictional resistance. The erosion of the mud is also a problem. It is to be recognized that pressures drop between the stator discharge to the annulus exterior of the drill may be of the order 200 to 1500 pounds per square inch and a volumetric rate of flow from 50 to about 600 gallons per minute, depending upon the depth, nature of the mud, size of the tool, designs of the nozzles of the bit.

The pressure drop and volume rate of flow of the mud through the stator depend on the horsepower requirement and drill and rpm of the drilling effort. This establishes the gallons per minute of mud that must be circulated. The mud input pressure is fixed by the total pressure drop through the drill string, the hydraulic motor, bit nozzle and annulus pressure drop. The volume by-passed through the bearings is subtracted from the flow through the nozzles. The pump must provide for sufficient input to supply the required flow rate and pressure drop. Mud by-passed through the bearings discharges into the hole annulus. It adds to the mud input required to supply that required to be passed through the nozzles and adds to the velocity of the mud in the annulus. The bit manufacturer usually supplies the nozzle pressure drop to give the required lifting effect and cutting action. Furthermore, the depth to which a well may be serviced by a given pump assembly and therefore the limit of bit advance depends on the permissible horsepower required to move the mud through the motor to and through the bit nozzles and return the cuttings to the surface. Any additional demand on the pump, required to supply excessive by-pass is a limitation on the depth to which a given drilling rig can go.

It is difficult to build a rubber bearing which is so finely tuned as to meet these parameters and not permit an excessive flow through the bearings. Furthermore, as has been stated above, pressure drops tend to erode the passageways in the rubber bearing so that they do not for long retain their original cross-sectional areas.

Further, while the universal joints do a fairly good job in the case of the helicoidal motors of converting the eccentric motion of the rotor to a rotary motion, there remains a residual force on the drive shaft which is transverse to the axis of rotation. This transverse force is periodic in direction, reversing itself on each reversal of the eccentric motion. Additionally, when drilling in steeply dipping formations or in drilling out dog legs, or in drilling deviated holes, particularly when using bent subs at the connecting rod, a thrust is encountered at the bit which is transverse to the bit axis. The result is a working of the rubber of the bearing.

An additional problem with rubber bearings is in the influence of the geothermal effect. The temperature in the bore hole may range up to several hundred degrees above ground temperature, depending on the depth. This adds to the heat developed from friction, which due to the low heat conductivity of rubber is not readily carried away by the circulating mud. Despite the cooling effect of the by-pass fluid, this temperature taken together with the frictional heat of the bearing, and the hysteresis of the rubber resulting from the cyclic transverse thrust of the drive shaft, all operate to impair the physical properties of the rubber. Failure of the rubber bearing is not uncommon.

An additional problem arises, as we have found from the failure in the bond between the rubber and the sleeve to which it is bonded. We have observed large pieces of the rubber bearing that have been torn away from the sleeve in use. We have solved the problem arising from deficiencies of the rubber material by employing instead of a rubber, a radial bearing of hard, rigid metal.

In the co-pending application Ser. No. 388,586, by employing material having a hardness greater than the "Sand" or other solid materials in the circulating mud, we avoid the problem arising from the erosion of the by-pass passageways. The bearings may be formed with restricted passageways which may be accurately formed to be having, and have, a hardness greater than the sand or other solid materials in the circulating mud, we avoid the problem arising from the erosion of the by-pass passageways. The bearings may be formed with restricted passageways which may be accurately formed to be metering passageways for the mud. Being made of hard metal, problems arising from maintaining the integrity of the radial bearing are avoided. Being made of rigid metal, the residual oscillatory forces transverse to the drive shaft are resisted and a true axial rotation is made possible. Being made of metal of good heat conduction, frictional heat will not build up in the bearing parts and the cooling effect of the mud will be effective to cool the bearing parts.

In our invention as described in said co-pending application, accurate metering characteristics are achieved. The mud is permitted to wet the rubbing surfaces and act as a lubricant.

DETAILED DESCRIPTION

This invention will be further described by reference to the drawings of which:

FIG. 1 is a somewhat schematic partial section of a motor assembly to which our invention may be applied.

FIG. 6 is a section taken at 6—6 of FIG. 2.

FIG. 7 is an enlarged view of a portion of FIG. 2.

Figure 2:
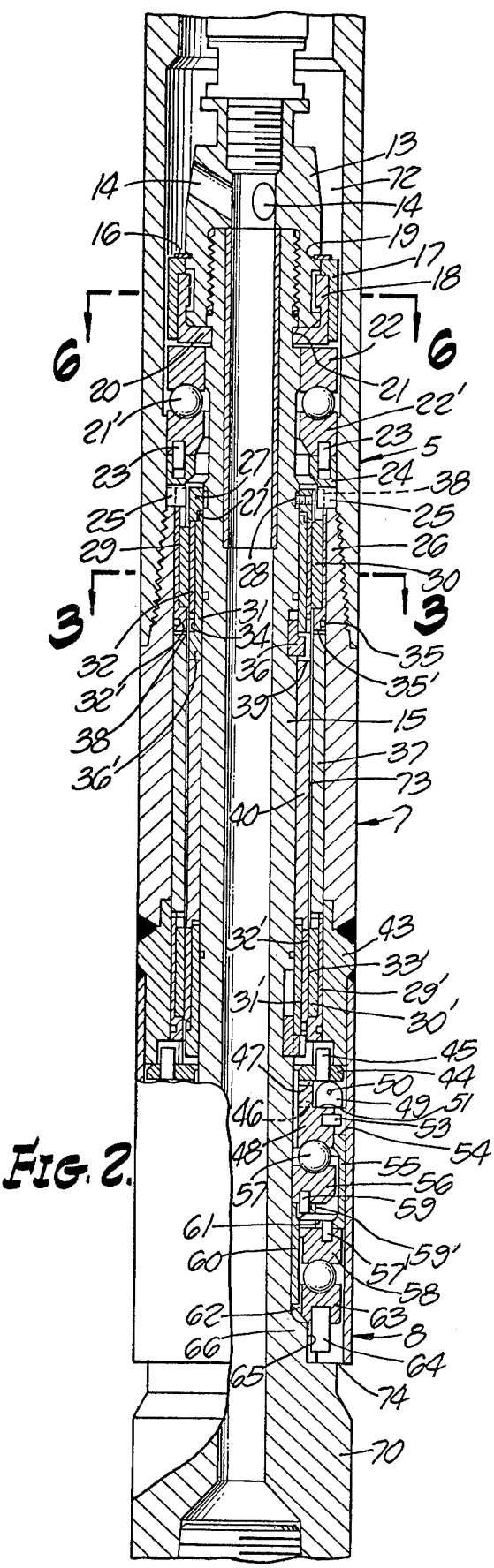
FIG. 2 is a vertical section of that portion of the motor such as is shown in FIG. 1, taken through the portion of the tool below the end of the connecting rod.

In FIG. 1, a by-pass valve of conventional design is positioned below the drill collar of a conventional oil well drill string. An example is shown in the Clark et al U.S. Pat. No. 3,005,507 patented Oct. 24, 1961. Since this valve forms no part of this invention and illustrates merely a conventional piece of equipment useful with systems such as the motor shown in FIG. 1, no further description is necessary.

A conventional drill string including the drill collar which imposes the weight on the drill bit may be connected to the by-pass valve by the usual pin and box-tool joint. The drill pipe extends to the surface and passes through a rotary table by means of the usual kelly.

THE MOTOR ASSEMBLY

While we have described our invention by reference to the preferred embodiment, it may be applied to any shaft and bearing assembly; and it is of particular value when used in an inhole motor, such as a turbine motor known as the turbo drill, an electrical motor with a hollow shaft through which the fluid may be passed or the progressive cavity motor described herein.

The motor shown in FIG. 1 is a progressing cavity motor. The motor housing 3 (see FIG. 1) is connected to the by-pass assembly 1. The motor housing 3 carries a stator 4 bonded to the interior surface of the housing 3. The connecting rod assembly housing 5 is connected to the motor housing 3 and the bearing housing 7. The bearing assembly housing 7 contains radial and thrust bearings assemblies. The housing 7 is connected by a pin and box connection to the housing 5, all to be more fully described below.

The rotor 9, mounted inside the stator 4, at its lower end is connected to the connecting rod 10 by a universal joint 11. The connecting rod 10 is connected to the tubular drive shaft 15 through the drive shaft cap 13 by a like universal joint 12. (See Gif. 2).

The universal joint may be such as described in the Neilson et al U.S. Pat. No. 3,260,318 patented July 12, 1966 or in the Neilson et al U.S. Pat. No. 3,260,069 patented July 12, 1966.

The connecting rod and universal joints may be enclosed in a flexible cover to protect them from erosion by the mud.

The motor shown is of the helicoidal type. The outer body of the motor that is the stator is composed of an elastomer, for example, a rubberlike compound, which creates a spiral cavity throughout its length to provide a dobule spiral groove. The passage of fluid through the stator 4 and by the rotor along its length causes a rotation of the rotor and a movement of the rotor from side to side creating eccentric rotation at the end of the rotor where it is connected to the connecting rod. Because of the universal joints, the eccentric motion is converted into a rotary motion at the drive shaft 15. The fluid as it exits the stator passes through the connecting rod housing 5, around the connecting rod and cap 13 through by-pass annulus 72. The cap 13 is provided with orifices 14 (see FIGS. 1 and 2). At this point, the mud is under very high pressure and passes in considerable volume from the exit of the stator.

The drive shaft cap 13 is screwed onto the drive shaft 15. It carries a retaining ring 16 positioned in a receiving groove 19 in the cap 13 and against which is set the drive shaft collar 17 which locks the split ring 18. The flange 20 of the split ring 18 enters the notch 21 of the drive shaft. The cap 13 carrying the orifice 14 is thus secured from unscrewing.

The upper bearing is formed of the upper race 22 spaced from the bottom of the flange 20 of the split ring 18 for purposes to be described further below. It is composed of the upper race 22, ball 21' and the lower race 22'. It is secured by pins 23 which fit in receiving bores in the ring 24 which carries dependent dogs 25 which fit into receiving notches formed in the end of the pin 26 of the housing 7. The ring 27 is mounted in receiving grooves formed in the drive shaft and secured in position by set screws 28. The race 22' is spaced from the shaft and the race 22 is spaced from the interior wall of the housing 6.

The ring 27 is counterbored to provide an annular space 27' underneath the ring and between the ring and the drive shaft.

The flow restrictor of our invention is combined with a radial bearing and is designed so that it will act to minimize the entry of sand or other abrasive particles into the bearing assemblies. It acts as a radial bearing as well as a flow restrictor. The Garrison U.S. Pat. No. 3,489,231 patented Jan. 13, 1970, and 3,456,746, patented July 22, 1969, illustrate such flow restrictor bearing assemblies but made of rubber.

The radial bearing flow restrictor is composed of a steel sleeve 29 containing a circular notch. The sleeve 29 is positioned in housing 7 and sealed against the wall of 7 by the O ring 35. A tungsten carbide sleeve 30 is positioned in the sleeve 29.

The ends of the sleeves 29 and 30 are notched to receive the dogs 25. The complementary rotating portion of the radial bearing includes a steel sleeve 31 which extends into the annular space 27' between the ring 27 and the drive shaft 15. The sleeve 31 is grooved along its length in a plurality of spaced grooves 34 to receive a plurality of circumambiently spaced tungsten carbide rods 32 spaced from each other.

The external diameter of the sleeve 31 is somewhat less than the internal diameter of the sleeve 30. The tungsten carbide rods 32 are of suitable cross-section; for example, rectangular cross-section. They are fitted into and held in the grooves 34 as by soldering or other suitable means. The rods extend the length of the groove 34. The external surfaces of the rods 32 are arcuate so as to be concentric with the interior surface of the tungsten carbide cylinder 30 and of substantially the same radius of curvature, thus forming a rubbing fit.

Because of the slightly different diameters of the steel sleeve 31 and tungsten carbide sleeve 30, an interrupted annular space 33 is provided extending between the rods 32. This forms fluid passageways from the outlet of the stator around the cap 13 and through the upper bearing and through the spaced parts above the radial bearing and through the restricted passageways 33.

Figure 13:
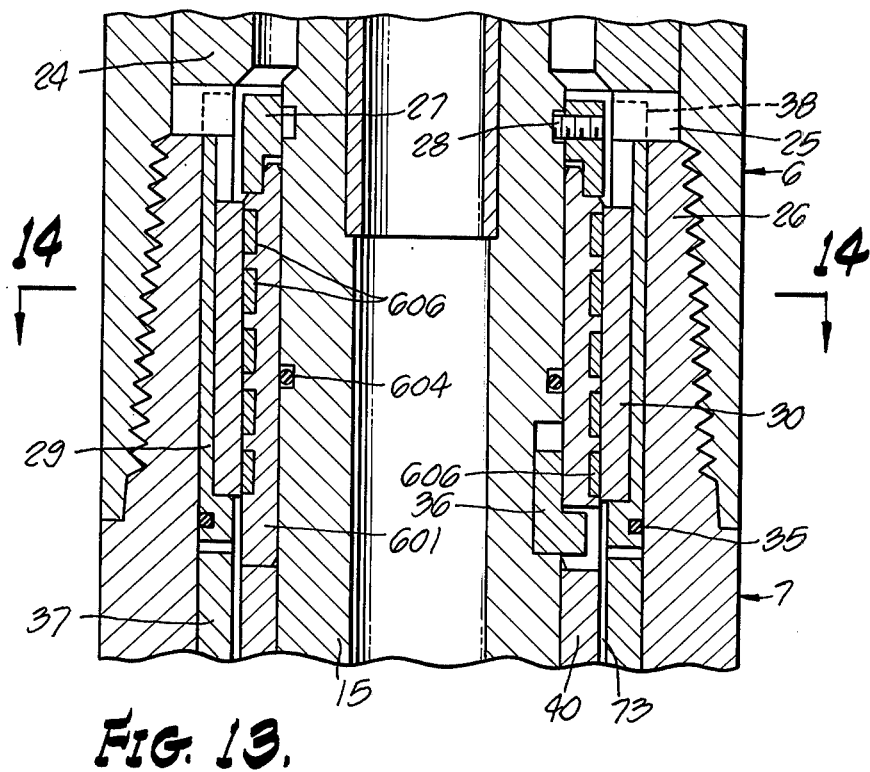
FIG. 13 is a sectional view of a modification of the radial bearings shown in FIG. 1.

As will be seen, the tungsten carbide sleeve 30 is a stationary member of the radial bearing being mounted on the stationary housing and held against rotation by the dogs 25 (see FIGS. 2, 7, and 13). The rotary member of the radial bearing is the sleeve 31 keyed by key 36 to the tubular shaft 15. The key 36 enters a notch 39 in the flange 36' of the sleeve 31.

The contiguous surfaces of 30 and the rods 32 form rubbing surfaces suitably smooth and thus act to direct the fluid and contained solids through the passageways. The use of tungsten carbide or other material of similar hardness will preserve the rubbing surfaces against scartching or deformation which may impair the utility of the rotary bearing restrictor. The frictional load is minimized by the fact that the surfaces are continually wetted as the interrupted annular arcuate passageways 33 sweep over the inner surface of 30.

Instead of tungsten carbide having a hardness of the same or greater number, we may use hard materials having Knoop or Vickers hardness of about 1700 or more kg/mm square, such as ceramics, for example, alumina and the nitrides or borides provided they have the impact resistance, hardness, tensile strength as well as Young's modulus suitable to serve in the place of tungsten carbide and particularly have a resistance to the abrasion effect from sand and mud.

The spacer sleeve 37 is notched at 38 at its upper end to receive the dog 35' depending from the sleeve 29. The spacer sleeve 40 is notched at its upper end at 41 to receive the dog 41' depending from 31.

The housing 43 is welded to the housing 7 and the housing 8. It carries a radial bearing flow restrictor of design similar to that of the upper radial bearing flow restrictor assembly. Like parts in the lower radial bearing assembly, shown in FIG. 2, carry the same number as in the upper radial bearing assembly but primed. The steel sleeve 29' carries the tungsten carbide sleeve 30'. The steel sleeve 31' is notched and carries bars 32' spaced apart and with the sleeve 30' form the restricted passageways 33' as in the upper radial bearing.

The sleeves 30' and 29' are notched at their upper ends to receive dogs depending from the spacer sleeve 37. The sleeve 31' is notched at its upper end to receive a dog depending from the sleeve 40.

The lower bearing assembly may be of any suitable design. As shown in FIG. 2, it is formed similarly to that shown in the Garrison et al U.S. Pat. No. 3,516,718 with some modification in the interlock between the races, the shaft, and the housing.

The lower radial bearing housing 43 is notched to receive pin 45 mounted in the wear plate 44.

The wear plate 44 carries a depending dog 47 which enters into a groove 46 in the upper race 48. The equalizer segment 49 of which there are a number spaced about the shaft 15, are mounted on a wire 50 and are positioned between the wear plate 44 and the race 48. The segments are made with an arcuate lower surface so as to present two pressure points, 51 bearing on the race 48 and pressure point 52 bearing on the end of the sleeve 55.

The race 48 is pinned to the sleeve 55 by the pin 53 which enters the notch 54 formed in the end of the sleeve 55. The ball 57 is positioned between the races 48 and 56. The race 56 is pinned by the pin 59 to the sleeve 60 at the end of 60. The sleeve 55 is pinned to race 58 by pin 57' which enters into the flange 61 at the end of the sleeve 55. The race 63 is notched at 62 to receive the end of the sleeve 60 and is pinned by pin 64 which is received in a notch 65 in the boss 66 above the bit box 70.

There is thus provided a passageway from the annulus 72 around the cap 13, through the annulus between the race 22 and the housing 5 and between the race 22' and the shaft 15, through the flow restrictor grooves 33, through the annular passageway 73 between the spacer sleeves 37 and 40, through the passageways 33' in the lower radial bearing assembly. These passageways communicate with the lower thrust bearing assembly which provides a fluid passageway through the assembly and between the races discharging through the end 74 of the housing 8 between the housing 8 and the shaft 15.

While the radial bearing flow restrictor assembly of our invention described above is useful with any thrust bearing, we prefer to employ spring loaded bearings such as are described in the aforesaid application Ser. No. 354,954, now U.S. Pat. No. 3,894,818.

Figure 5:
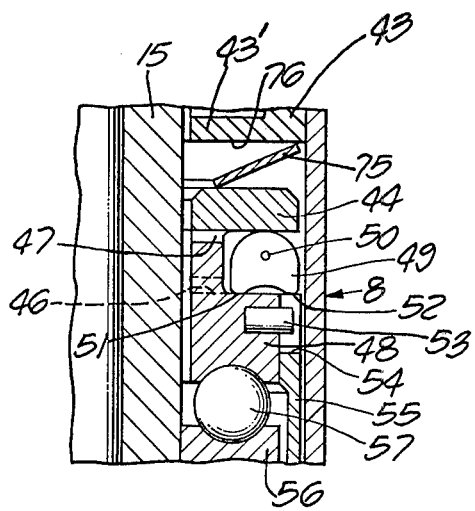
FIG. 5 is a partial section of a modified detail of FIG. 2.

For example, the bearings described in connection with FIG. 2 may be modified as shown in FIG. 5 by omitting pin 45 and the receiving notch and providing an internal flange 43' on housing 43, introducing a spring, for example, a Belleville spring washer 75, between the wear plate 44 and the end 76 of the housing 43. However, we prefer to employ the bearing assembly shown in FIG. 4 which is the invention of one of us and is described in the copending application Ser. No. 354,954.

Figure 3:
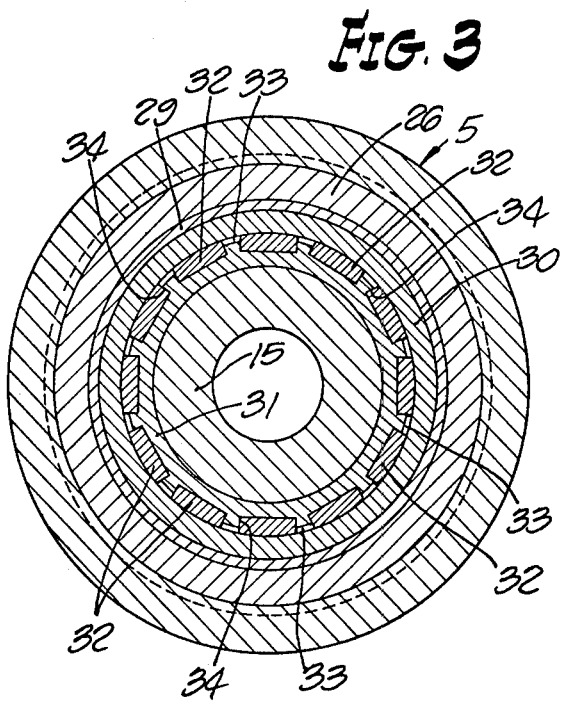
FIG. 3 is a section taken on line 3—3 of FIG. 2.
Figure 4:
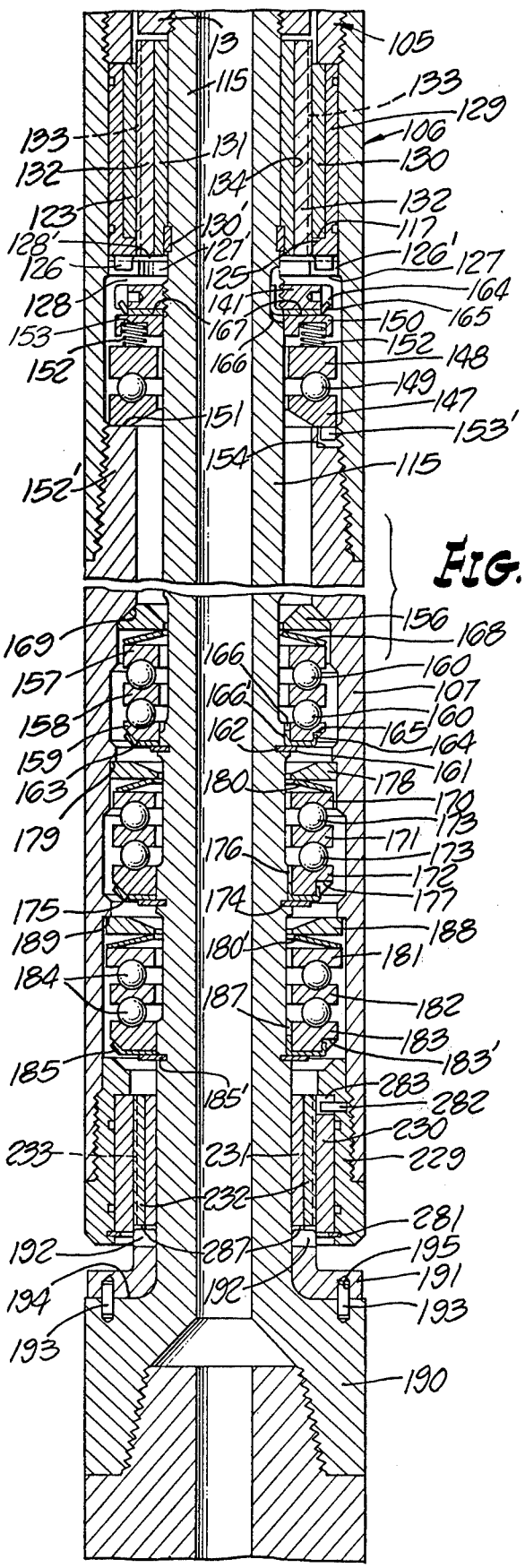
FIG. 4 is a sectional view of a modification of the bearing shown in FIGS. 2 and 3.

The radial bearing flow restrictor of FIG. 4 assembly is constructed similarly to those shown in FIGS. 2 and 3, with the modifications shown in FIG. 4 and describe below. Parts of the radial bearing like those described in connection with FIGS. 2 and 3 are numbered with like numbers but 100 greater. The modifications to mount the radial bearing in the construction of FIG. 4 are described below.

The sleeve 131 is spaced below the drive shaft cap 13 into which the tubular drive shaft 115 is threaded and keyed at the key 130', so as not to shoulder against the end of 13 (see FIG. 4).

As in the forms shown in FIGS. 2 and 3, the external diameter of the sleeve 131 is somewhat less than the internal diameter of the tungsten carbide sleeve 130. The sleeve 131 is provided with a plurality of circumambiently disposed grooves 134 into which are fitted tungsten carbide rods 132 of cross section, as in the form of FIGS. 2 and 3. They are similarly fitted into and held in the grooves 134 and extend the length of the sleeve 131. As described above, the external surface of the rods 132 are arcuate so as to be concentric with the interior surface of the tungsten carbide sleeve 130, thus forming a rubbing fit. Because of the slightly different dimensions of the outside diameter of the steel sleeve 131 from the inside diameter of the sleeve 130, an interrupted annular space 133 is provided extending between the rods 132 as in the form of FIGS. 2 and 7.

The end of the sleeve 129 is formed with diametrically spaced dogs 126 which fit into diametrically opposed notches 126' in the ring flange 127 formed integrally with the housing 106. The flange 127 is spaced from the bottom of the radial bearing to provide an annulus 128. The nut 141 is threaded to the exterior of the drive shaft 115. The nut 141 is spaced from the flange 127 at 128 to provide an annular channel. As will be observed, the discharge of fluid from the restricted passageways 133 enters the annulus 128', and passes around the dog 126 and through annulus 127' between drive shaft 115 and ring flange 127 into the annulus 128.

As in the case of the radial bearings of FIG. 2, instead of tungsten carbide, we may use other materials, as described previously.

The upper bearing assembly shown in FIG. 4 composed of the races 148 and 147 and balls 149 together with the pressure plate 150 and associated springs 152 set in the spring retaining bores 153 form the upper bearing assembly. The nut 141 is screwed to the shaft and locked by the lock washer 167 carrying a finger 166' fitting into a vertical groove 166 and having a plurality of end fingers 164 which are bent up to fit into a number of end grooves 165 formed in the outside surface of the nut. The assembly supports the weight of the rotor, connecting rod, drive shaft and drill bit when the bit is raised off bottom by means of the drilling lines conventionally used in oil well drilling. In the form shown in FIG. 4, the tool is in position as it would be with a load imposed on the bit by the drill string including the housings 105, 106, and 107 through the medium of the drive shaft as will be more fully described below.

Attention is drawn to the provision of clearance between the end of the drive shaft cap 13 (see FIG. 4) and the radial bearing sleeve 131 and rods 132 and the provision of annulus 128 and annulus 128'. The purpose of these clearances will be further described below.

When the tool is in the position shown in FIG. 4, as with the bit in drilling position on bottom, with the load of the drill string and housing on the lower bearings, the load is off the upper thrust bearing. The nut 141 exerts a sufficient compression of the springs 152 via plate 150 to hold races 148 and 147 snugly against the balls 149. The race 147 is positioned on top of the end 151 of the pin 152' of the housing 107. The dog 153' integrally formed with the race 147 fits into an endnotch 154 positioned in the end 151.

The housing 107 is of enlarged diameter ending in a beveled shoulder 169 against which is positioned the load plate 156. The races 157, 158, and 159 and balls 160 form an upper tandem bearing assembly. This assembly is supported on the retaining ring 161 positioned in groove 162 of the drive shaft 115.

The lowermost race 159 is locked in position on the drive shaft 115 by means of a lock washer 163 having extended fingers 164 which are bent up to enter notches 165 in the outer surface of race 159 and has internal finger 166' set in a receiving groove 166 in the shaft 115. The Belleville spring 168 is positioned between the race 157 and the load-transmitting pressure plate 156 seated against the beveled shoulder 169.

A similar bearing assembly is provided, composed of races 170, 171 and 172 and balls 173 which form a second set of tandem bearings. The lowest race 172 is supported on the retainer ring 174.

The lower race is locked in position on the drive shaft by means of a lock washer 175 similar to lock washer 163. The internal finger is positioned in the groove 176 and the external fingers in the circumferentially spaced end notches 177. The pressure plate 178 is seated against the internal shoulder 179 with the Belleville spring 180 positioned between the pressure load transmitting plate 178 and the upper race 170.

Similar arrangement is provided in connection with the lowest tandem bearing assembly composed of the races 181, 182, and 183 and balls 184. Race 183 has a plurality of circumambiently arranged notches 183'. The lock washer 185 has a structure similar to the structure of the lock washer 163. The external fingers of the lock washer are bent up into the notches 183' spaced about the circumference of the race 183. The internal finger is bent up into the groove 187 in the manner similar to that described in connection with the lock washer 163. The load transmitting plate is positioned underneath the internal ledge 189 to bear on the Belleville spring 180' mounted between the pressure plate 188 and the race 181. The lower race 183 is supported on the retainer ring 185'.

The end radial bearing assembly is constructed similarly to the upper radial bearing assembly and that described in connection with FIG. 2 with some modifications as will be described below, like parts bearing the same number as in the radial bearings in FIG. 2 but with numbers which are 200 greater.

The outer tungsten carbide cylinder 230 is mounted in the fitting 229 and sealed by O rings and held in position by retaining ring 281 and anti-rotation pin 282 which enters the notch 283 in 230.

The complementary steel sleeve 231 is mounted on the surface of the drive shaft 115. It carries tungsten carbide rods 232, in grooves and spaced from each other to form restricted passageways 233 as in the upper radial bearing.

The sleeve 231 is locked to the shaft 115 and the sleeve 230 is locked to 229. Fitting 229 is locked to housing 107.

The drill bit box 190 is formed integrally with the drive shaft 115 at the end thereof. The box carries a fitting 191 which has dogs 192 diametrically arranged which are adapted to fit into the notches 287 at the ends of 231 and 232. The fitting 191 is located on the drill bit box shoulder 194 by pins 193 positioned in the box 190 and by entry into the bores 195.

As stated above, the assembly as shown in FIG. 4 shows the parts with the load on the lower bearing as if the weight of the drill string was on the bit as in drilling position. In that case, the dogs 192 are still entered into the slots 287. The load transmitted to plates 156, 178, and 188 has partially compressed the Belleville springs.

When the drill string is raised to bring the bit off bottom, the load on the Belleville springs is reduced but remains sufficiently loaded to hold the races snugly against the balls. The housings and shaft have moved axially relative to each other. As described above, the weight of the rotor, connecting rod and drive shaft is now on the pressure plate 150 and via springs 152 on the upper thrust bearing.

Figure 8:
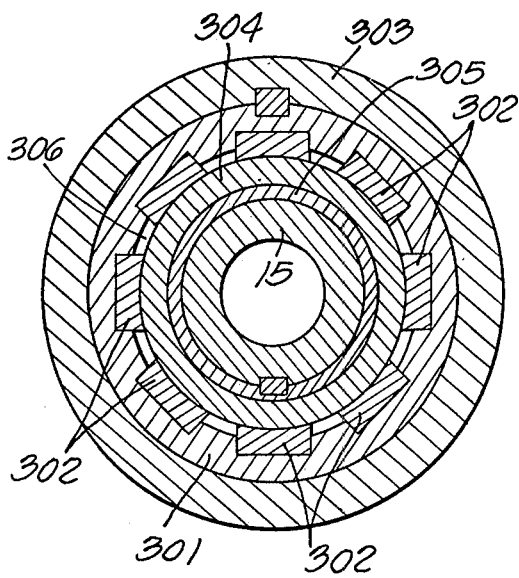
FIG. 8 is a section on line 3—3 of a modification.

FIG. 8 shows a modification of the radial bearing of FIGS. 1 through 7 in which the sleeves carrying the tungsten carbide elements are mounted in reverse to that shown in FIGS. 1 through 7. The steel sleeve 301 carrying the tungsten carbide bars 302 is keyed to the interior of the housing 303 and carries the tungsten carbide bars 302 in a manner similar to 31 of FIG. 7.

The tungsten carbide sleeve 304 is mounted on the steel sleeve 305 in a manner similar to the tunsten carbide sleeve 30 shown in FIG. 7 and the steel sleeve 305 is mounted by means of a suitable key on shaft 15 in a manner similar to that shown in FIG. 7. The steel sleeves are interlocked with the parts above and below the ends of the sleeves in a manner similar to that shown in connection with FIGS. 1 through 7. It will be observed, however, that the steel sleeve mounted on the shaft carries the tungsten carbide sleeve while the steel sleeve mounted on the interior of the housing carries the circumambiently spaced bars 302. The internal diameter of the steel sleeve 301 is greater than the external diameter of the tungsten carbide sleeve 304 thus providing the interrupted annular passageway 306 extending the full length of the sleeves and forming the fluid communication between the ends of the sleeves.

Figure 9:
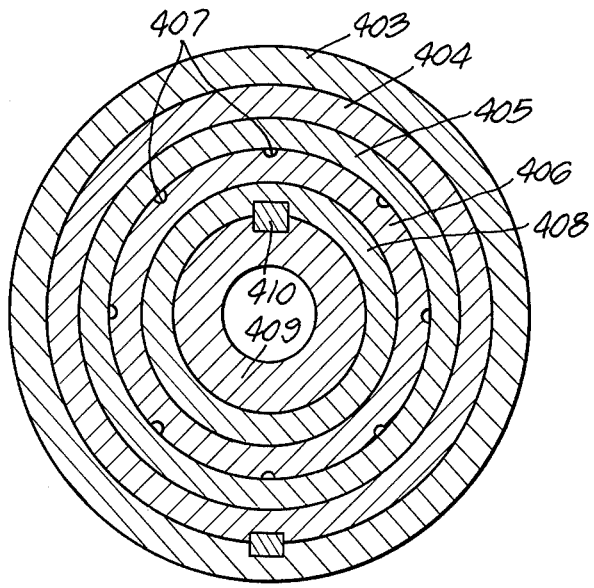
FIG. 9 is a sectional view through a modification of the bearing of our invention.
Figure 10:
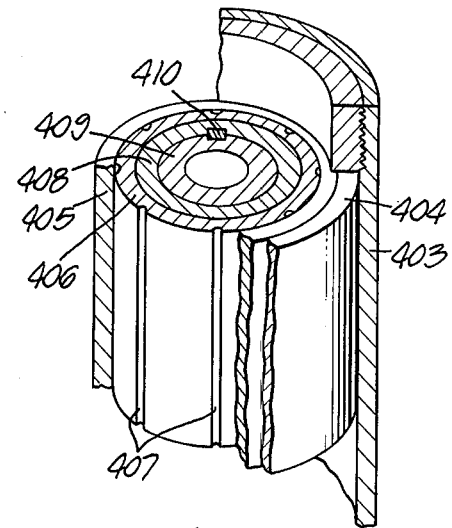
FIG. 10 is a perspective view, partly broken away, of the modification of FIG. 9.

FIGS. 9 through 12 show a modification of our invention, by which the hard material bearing is formed of two sleeves of the hard material referred to above and mounted on the shaft and housing in the manner described above. As shown in FIGS. 9 and 10, the grooves 407 are formed in the inner bearing sleeve 406, mounted in the sleeve 408, keyed to the shaft 409 by the key 410. The bearing sleeve 405 is mounted on the sleeve 404 in the housing 403.

Figure 11:
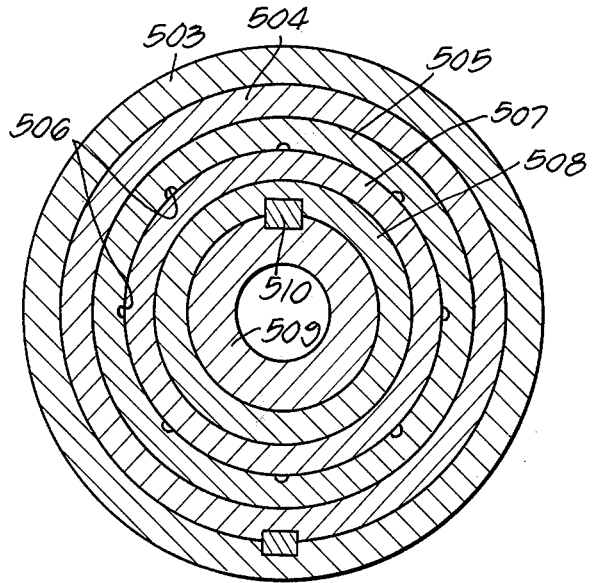
FIG. 11 is a sectional view of another modification of our invention.
Figure 12:
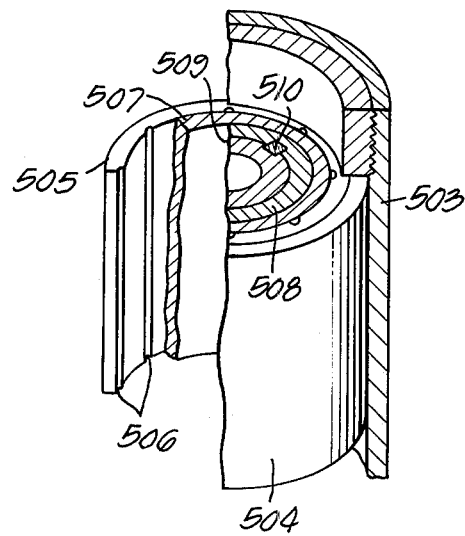
FIG. 12 is a perspective view, partly broken away, of the modification of FIG. 11.

In FIGS. 11 and 12 the grooves 506 are formed in the outer bearing sleeve 505, mounted in sleeve 504 in the housing 503. The inner bearing sleeve 508 is mounted on the shaft 509 by the key 510.

Figure 14:
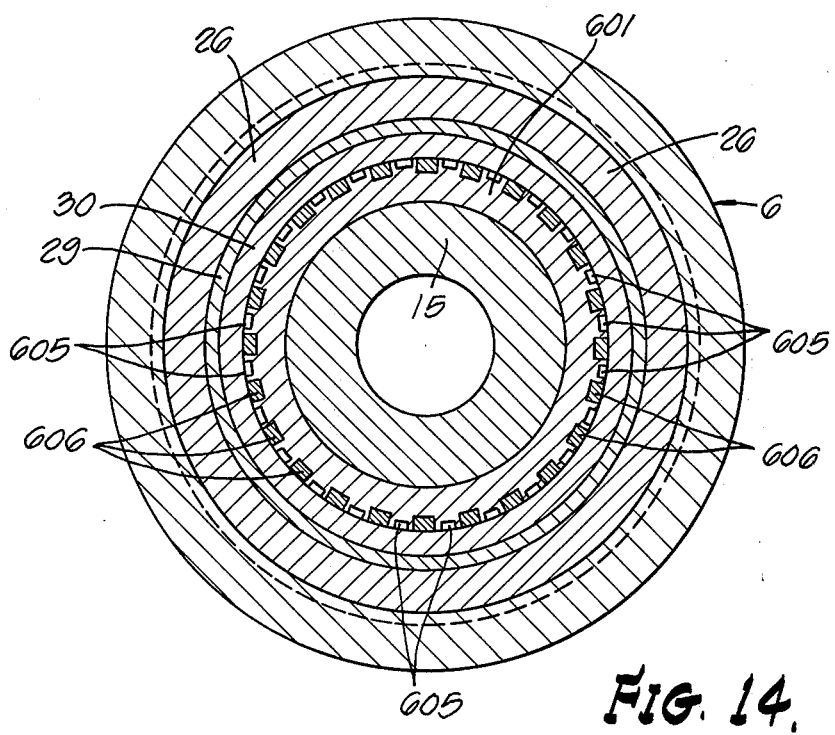
FIG. 14 is a section taken on line 14—14 of FIG. 13.

In FIGS. 13 and 14, the structure is the same as shown in FIGS. 1, 4, and 7 except that the sleeves 31 and 34 are replaced by sleeve 601. Sleeve 601 may be made of solid hard materials, such as tungsten carbide and alumina as in the other forms described above or particles of the aforesaid hard materials bonded with metal matrix as described above and suitably formed into the shapes described above. We prefer, however, that the rectangular inserts 606 be spaced in longitudinal and circumambient array and bonded by fusion in rectangular grooves formed in sleeve 601. Sleeve 601 is preferably made of material known as matrix in the art of making diamond bits.

We have found that the use of solid bearing members made of the hard materials such as described above are brittle and tend to break up when the transverse impact by the shaft becomes large. Further, in the case of the form, such as shown in FIG. 3 where the bars 32 are set in a steel sleeve, the annular spaces 33 are undercut to an extent sufficiently to destroy the bond between the bars 32 and the sleeve 31. Further, the bars are brittle and are subject to destruction by impact forces.

The form shown in FIGS. 9–12 formed entirely of the hard material will resist the erosion of the grooves 407 or 506. However, they are brittle and have the disadvantage described above.

We have solved the problem of brittleness by employing instead of solid shapes of hard material, either as bearing sleeves or as the bars, metal matrix bonded particles of the hard materials described above. Such material will have the desired resistance to erosion and the necessary properties to resist injury to the forces imposed on them during use by the movement of the shaft.

Thus, in FIG. 3, the sleeves 30 and 31 as well as the unit 32 may be made of particles of hard material such as tungsten carbide or alumina particles dispersed in a metal matrix. In FIG. 8, the sleeve 301, bars 302, and sleeve 304 may be similarly constructed. So, also, may sleeves 404 and 408 in FIGS. 9 and 10 and sleeves 505 and 508 of FIGS. 11 and 12 be formed of the matrix bonded hard particles.

Preferably, also, the sleeve 601 is made of the matrix bonded hard particles and is formed with longitudinally extending grooves 605 connecting the space above the flow restrictor with the space below the flow restrictor.

The bearing elements of my invention may be fabricated by standard techniques from tungsten carbide or ceramic material such as alumina. A preferable material is the metal bonded hard particles such as have been employed in the abrader arts.

The methods for producing shapes of metal bonded hard materials such as referred to above are described in the Wilder et al U.S. Pat. Nos. 3,757,878; 3,757,879; and 3,841,852.

The particles of hard material such as described above may be dispersed in a metal matrix powder and introduced into a mold of desired shape. The temperature of the mold is raised to fuse the metal and bond the hard particles. The particles of hard material, for example, of Knoop hardness of about 1800 or higher are dispersed and held in the metal matrix such as copper-based alloys such as brass or bronze alloys and copper-based alloys containing alloying metal such as one or more of the following: nickel, cobalt, tin, zinc, manganese, iron and silver. The matrix bonded material has suitable compressive and impact strength and microhardness. (See U.S. Pat. No. 3,841,852, col. 7, line 53, et seq.)

We claim:

1. In combination, a housing member, a shaft member, a radial bearing mounted between the housing member and the shaft member, said radial bearing including a sleeve member comprising matrix bonded hard particles, a complementary bearing member comprising matrix bonded hard particles mounted in said bearing in bearing relationship with said sleeve, passageways extending through one of said members.

2. A radial bearing adapted for mounting between a housing member and a shaft member, a first sleeve adapted for mounting on one of said members, a complementary bearing member adapted for mounting on the other of said members in bearing relationship with said first sleeve, said complementary bearing member including a second sleeve of exterior diameter less than the interior diameter of the first-mentioned sleeve, a plurality of bars mounted circumambiently about said second sleeve and in bearing relation with said first sleeve, interrupted annular passageways between said bars and between said first sleeve and the second sleeve, said first sleeve and said bars being formed of matrix bonded hard particles.

3. In a motor assembly including a motor, fluid input means to said motor and a drive shaft member, connected to said motor, a housing member for said drive shaft, a radial bearing between said drive shaft and said housing, said radial bearing comprising a first sleeve member mounted on one of said members, a complementary bearing member mounted in bearing relationship to said first sleeve member, passageway extending through one of said members to pass fluid discharging from said motor, said bearing members comprising matrix-bonded hard particles.

4. In a motor assembly of claim 3, said complementary bearing member including a second sleeve of exterior diameter less then the interior diameter of the first sleeve, said complimentary member comprising a second sleeve, a plurality of bars mounted circumambiently about said second sleeve and in bearing relation to said first sleeve, interrupted annular passageways between said bars and between said first sleeve and the second sleeve.

5. The fluid motor of claim 3, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, a by-pass passageway from said outlet to said passageways.

6. In a fluid motor, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a first sleeve mounted on one of said members, complementary bearing member mounted on the other of said members in bearing relationship to said first sleeve, said passageways through said bearing communicating with said thrust-bearing housing, said first sleeve and said complementary bearing member comprising matrix bonded hard particles of Knoop hardness of about 1600 or higher.

7. In a fluid motor, which includes a rotor, a stator, a drive shaft connected to said rotor, housing for said shaft, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a first sleeve mounted on one of said members, complementary bearing member mounted on the other of said members in bearing relationship to said first sleeve, said radial bearing positioned between said shaft and said housing and positioned between said thrust bearing and the said stator, a second radial bearing positioned between said shaft member and said housing member and positioned between said thrust bearing and the end of said housing member, said second radial bearing comprising a first sleeve mounted on one of said members, a second complementary bearing sleeve mounted on the other of said members in bearing relationship to said first sleeve, said first sleeve, said second sleeve, and said bearing members being each formed of matrix bonded hard particles of Knoop hardness of about 1600 or higher.

8. In a fluid motor, which includes a rotor, a stator, a drive shaft member connected to said rotor, housing member for said drive shaft member, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a first sleeve mounted on one of said members, complementary bearing member mounted on the other of said members in bearing relationship to said first sleeve, in which said complementary bearing member comprises a second sleeve, a plurality of bars mounted circumambiently about said second sleeve and in bearing contact with said first sleeve, said second sleeve being of exterior diameter less than the interior diameter of said first-named sleeve, interrupted annular passageways between said bars and between said first sleeve and said second sleeve, said first sleeve and said bars being each formed of matrix bonded material of Knoop hardness of 1600 or higher.

9. In a fluid motor, which includes a rotor, a stator, a drive shaft member connected to said rotor, housing member for said drive shaft member, and fluid passageways into the stator, an outlet from said stator, the improvement which includes a thrust bearing assembly mounted between said housing member and said drive shaft member in thrust transmission relationship between said housing member and said shaft, radial bearing in said housing between said shaft member and said housing member, said radial bearing comprising a first sleeve mounted on one of said members, complementary bearing member mounted on the other of said members in bearing relationship to said sleeve, a by-pass passageway in said housing and connected to said outlet, passageways between the first sleeve and said complementary bearing member extending through said rotary bearing and communicating with said by-pass passageway and with the said thrust-bearing housing, a second radial bearing positioned in said housing between said thrust bearing and the end of said housing, said radial bearing comprising a second sleeve mounted in one of said members, a second complementary bearing mounted on the other of said members in bearing relationship to said sleeve, said first and said second sleeve and said bars each being formed of matrix bonded material of Knoop hardness of about 1600 and higher.

10. In a fluid motor, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, radial bearings in said housing between said shaft member and said housing member, said radial bearing comprising a first sleeve mounted on one of said members, a first complementary bearing member mounted on the other of said members in bearing relationship to said sleeve, passageways between the said first sleeve and said compelementary bearing member extending through said radial bearing and communicating with said by-pass passageway and with the said thrust-bearing housing, a second radial bearing positioned in said housing between said thrust bearing and the end of said housing, said radial bearing comprising a second sleeve mounted in one of said members, a second complementary bearing mounted on the other of said members in bearing relationship to said second sleeve, in which said complementary bearing includes a third sleeve of exterior diameter less than the interior diameter of the second sleeve, and is mounted on one of said members, a plurality of bars mounted circumambiently about said third sleeve in rubbing contact with said second sleeve, interrupted annular passageways between said bars and between said second sleeve and the third sleeve, said passageways communicating with said housing member above said second radial bearing and with the end of said housing member, said first sleeve and said second sleeve and said bars formed of matrix bonded particles of Knopp hardness of 1600 or higher.

11. A radial bearing adapted to be mounted between a shaft and a housing, said radial bearing comprising a sleeve adapted to be mounted on one of said members and a complementary bearing sleeve adapted to be mounted on the other of said members in bearing relationship to said first sleeve, circumambient fluid passageways in the form of grooves in one of said sleeves, said sleeves being formed of hard material.

12. The radial bearing of claim 11 in which said materials are chosen from the group consisting of alumina, nitrides and borides.

13. The radial bearing of claim 11 in which the material is ceramic particles of Knoop hardness of 1600 kg/mm square or higher bonded in a matrix.

14. A radial bearing adapted to be mounted between a shaft member and a housing member comprising a first sleeve and a second sleeve, a plurality of discrete shaped members mounted in said second sleeve in a spaced vertical and circumambient array, the surface of the shaped members on a cylindrical surface in bearing relation to said first sleeve, said shaped members comprising matrix bonded hard particles.

15. The radial bearing of claim 14, longitudinally extending passageways in said second sleeve between said vertical arrays.

16. A fluid motor assembly including a motor, fluid input means to said motor and drive shaft member connected to said motor, a housing member for said drive shaft, a radial bearing according to claim 14 mounted between said drive shaft and said housing in which said particles are ceramic particles having a Knoop hardness of about 1600 or higher.

17. The fluid motor of claim 15, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, a by-pass passageway from said outlet to said passageways.

18. In a fluid motor, which includes a rotor, a stator, a drive shaft connected to said rotor, housing for said shaft, and fluid passageways into the stator, an outlet from said stator, the improvement which includes a thrust bearing assembly mounted between said housing member and said drive shaft member in thrust transmission relationship between said housing member and said shaft, radial bearing according to claim 15 in said housing between said shaft member and said housing member, said radial bearing positioned between said shaft and said housing and positioned between said thrust bearing and the said stator, a second radial bearing according to claim 15 positioned between said shaft member and said housing member and positioned between said thrust bearing and the end of said housing member.

19. In a fluid motor, wjhich includes a rotor, a stator, a drive shaft member connected to said rotor, housing member for said drive shaft member, and fluid passageways into the stator, an outlet from said stator, the improvement which includes a thrust bearing assembly mounted between said housing member and said drive shaft member in thrust transmission relationship between said housing member and said shaft, radial bearing according to claim 15 in said housing between said shaft member and said housing member, said radial bearing comprising a first sleeve mounted on one of said members, a by-pass passageway in said housing and connected to said outlet, said passageways communicating with said by-pass passageway and with the said thrust-bearing housing, a second radial bearing according to claim 15 positioned in said housing between said thrust bearing and the end of said housing.

20. In a fluid motor, which includes a rotor, a stator, a drive shaft connected to said rotor, housing for said drive shaft, and fluid passageways into the stator, an outlet from said stator, the improvement which includes a thrust bearing assembly mounted between said housing member and said drive shaft member in thrust transmission relationship between said housing member and said shaft, radial bearings according to claim 15 in said housing between said shaft member and said housing member, said passageway communicating with said by-pass passageway and with the said thrust-bearing housing, a second radial bearing according to claim 15 positioned in said housing between said thrust bearing and the end of said housing.

* * * * *